(12) United States Patent
Saitou

(10) Patent No.: US 6,997,843 B2
(45) Date of Patent: Feb. 14, 2006

(54) SHIFT CONTROL APPARATUS FOR AUTOMATIC TRANSMISSION

(75) Inventor: Yuuji Saitou, Shizuoka (JP)

(73) Assignee: JATCO LTD, Fuji (JP)

( * ) Notice: Subject to any disclaimer, the term of this patent is extended or adjusted under 35 U.S.C. 154(b) by 124 days.

(21) Appl. No.: 10/489,958

(22) PCT Filed: Sep. 27, 2002

(86) PCT No.: PCT/JP02/10058

§ 371 (c)(1), (2), (4) Date: Mar. 18, 2004

(87) PCT Pub. No.: WO03/029699

PCT Pub. Date: Apr. 10, 2003

(65) Prior Publication Data

US 2004/0242371 A1 Dec. 2, 2004

(30) Foreign Application Priority Data

Sep. 28, 2001 (JP) ............................ 2001-302946

(51) Int. Cl.
*F16H 61/08* (2006.01)
(52) U.S. Cl. ...................... 475/269; 477/143; 477/144
(58) Field of Classification Search ................ 477/143, 477/144; 701/66; 475/284, 285, 277, 378, 475/288
See application file for complete search history.

(56) References Cited

U.S. PATENT DOCUMENTS 4,486,838 A 12/1984 Itoh et al.
5,203,234 A * 4/1993 Asada et al. ................ 477/143
5,547,437 A * 8/1996 Kamada et al. ............. 477/143
5,863,276 A 1/1999 Lee
5,924,957 A * 7/1999 Yasue et al. ................ 477/144
6,270,444 B1 8/2001 Tsutsui et al.
6,626,786 B1 * 9/2003 Hayabuchi et al. ......... 475/127

FOREIGN PATENT DOCUMENTS

JP 62-137457 A 6/1987
JP 7-110065 A 4/1995
JP 2001-132835 A 5/2001

OTHER PUBLICATIONS

U.S. Appl. No. 10/489,957, filed Mar. 18, 2004, Saitou et al.
U.S. Appl. No. 10/489,959, filed Mar. 18, 2004, Saitou et al.
U.S. Appl. No. 10/490,161, filed Mar. 18, 2004, Inuta.

* cited by examiner

*Primary Examiner*—Roger Pang
*Assistant Examiner*—Justin K. Holmes
(74) *Attorney, Agent, or Firm*—Foley & Lardner LLP

(57) ABSTRACT

In a shift control apparatus for an automatic transmission, there is provided a target speed change permitting means which; at the time of a dual changeover shift which is a shift from an Nth speed achieved by bringing a first friction element and a second friction element to an engagement state, to an (N-α)th speed achieved by engaging a third friction element and a fourth friction element, and which has at least one intermediate speed, between the Nth speed and the (N-α)th speed, achieved by engaging the second friction element and the third friction element; checks a driver's shift intention again at the time of attainment of the gear ratio corresponding to the intermediate speed, and permits the target speed to be changed to the speed according to the driver's intention when the target speed is different from the (N-α)th speed.

12 Claims, 10 Drawing Sheets

|  | LOW/C | 3-5R/C | H/C | L&R/B | 2-6/B | LOW/OWC |
|---|---|---|---|---|---|---|
| 1ST | ○ |  |  | ⊗ |  | ◐ |
| 2ND | ○ |  |  |  | ○ |  |
| 3RD | ○ | ○ |  |  |  |  |
| 4TH | ○ |  | ○ |  |  |  |
| 5TH |  | ○ | ○ |  |  |  |
| 6TH |  |  | ○ |  | ○ |  |
| REV |  | ○ |  | ○ |  |  |

⊗: ENGINE BRAKE

SHIFT CONTROL APPARATUS FOR AUTOMATIC TRANSMISSION

TECHNICAL FIELD

The present invention relates to a shift control apparatus for an automatic transmission having a hydraulic circuit configuration provided with an oil pressure control apparatus for independently controlling engagement pressures to a plurality of friction elements participating in the shift of the automatic transmission.

BACKGROUND ART

There is known a shift control apparatus for an automatic transmission as recited in Published Japanese Patent Application, Kokai No. 2001-132835, for example.

This publication discloses technique designed to achieve smooth shift and reduce a shift time in a so-called dual changeover shift in which two or more friction elements are released and two or more friction elements are engaged at a time, such as a shift from a sixth speed attained by engagement of a first friction element and a second friction element, to a third speed attained by engagement friction elements (third and fourth friction elements) other than the first and second friction elements.

Specifically, this technique is designed to start the release of the first friction element form the state of sixth speed, then to start the release of the second friction element, and to complete the engagement of the fourth friction element after the completion of engagement of the third friction element. By so doing, this technique achieves a smooth shift with a reduced shift time in a continuous manner having no two-step form without establishing an intermediate shift speed which can be established between the sixth speed and the third speed, by engagement of the second friction element and the third or fourth friction element.

However, the automatic transmission shift control apparatus of the earlier technology performs a so-called reshift inhibition control for inhibiting a change of a target shift speed from an end of a predetermined time after a start of the shift until the end of the shift control with the attainment of the final shift speed, in order to prevent shift shock which would be caused normally by change of friction elements under the control and abrupt change of oil pressure in a series of shift control operations. Therefore, if the driver varies the accelerator depression quantity, and hence the shift speed on a shift diagram differs from the final shift speed of the dual changeover shift in progress, it takes a considerable amount of time to finally attain the shift speed on the shift line conforming to the driver's intention.

This problem is explained by the use of a time chart of FIG. 11. After the 6-3 shift is started at instant to, and the change of the target speed of 6-3 shift is inhibited at instant t2, a 6-4 shift request is produced at instant t3 in response to crossing across a 3-4 upshift line due to a change of the accelerator depression quantity by the driver. Since the change of the target shift speed inhibited, the 6-3 shift is continued. At te4, the third speed is established, the change of the target speed is permitted, and the fourth speed request is accepted. Then, the 3-4 shift is performed and completed at instant t5. Thus, in spite of the driver's request to change the target speed at instant t2, the shift according to the driver's intention is achieved at instant t5. It takes a very long time to attain the speed according to the driver's intention.

In view of the above-mentioned problem, it is an object of the present invention to provide an automatic transmission shift control apparatus capable of responding to a driver's request quickly and achieve a dual changeover shift smoothly, even when the driver changes the shift intention and requests a shift to another speed during the process of shift achieved by a plurality of changeover control operations, after the change of target speed is inhibited.

DISCLOSURE OF INVENTION

To attain the above-mention object, in the invention as in claim 1, in a shift control apparatus for an automatic transmission provided with a shift control means to achieve a plurality of forward speed by the control of engagement and disengagement of a plurality of friction elements participating in the shift of the automatic transmission, there are further provided: a dual changeover shift judging means judging a shift from an Nth speed achieved by bringing at least a first friction element and a second friction element to an engagement state, to an (N-α)th speed which is achieved by bringing at least the first friction element and the second friction element to a release state and engaging a third friction element and a fourth friction element, and which has at least one intermediate speed, between the Nth speed and the (N-α)th speed, achieved by engaging the second friction element and the third friction element; a jump shift control means achieving the shift from the Nth speed to the (N-α)th speed by releasing the first friction element and engaging the fourth friction element at least at the time of judgment of dual changeover shift, decreasing an engagement force of the second friction element before a gear ratio reaches a gear ratio corresponding to the intermediate speed, and releasing the second friction element and engaging the third friction element at least after passage of the gear ratio through the gear ratio corresponding to the intermediate speed; a target speed change inhibiting means which decides to inhibit a target speed from being changed from the (N-α)th speed at a predetermined timing after a start of the shift from the Nth speed to the (N-α)th speed until an end of the shift control; and a target speed change permitting means reconfirming a driver's shift intention when the gear ratio reaches the gear ratio corresponding to the intermediate speed, and permitting the target speed from being changed to a driver's intended speed when the target speed differs from the (N-α)th speed, even if a change of the target speed is inhibited.

In the invention according to claim 1, in the dual changeover shift judging means, a judgment is made as to the shift from the Nth speed achieved by bringing at least a first friction element and a second friction element to an engagement state, to an (N-α)th speed which is achieved by bringing at least the first friction element and the second friction element to a release state and engaging the third friction element and the fourth friction element, and which has at least one intermediate speed, between the Nth speed and the (N-α)th speed. At the time of judgment of this dual changeover shift, in the jump shift control means, the shift from the Nth speed to the (N-α)th speed is achieved by releasing the first friction element and engaging the fourth friction element at least at the time of judgment of dual changeover shift, decreasing an engagement force of the second friction element before a gear ratio reaches a gear ratio corresponding to the intermediate speed, and releasing the second friction element and engaging the third friction element at least after passage of the gear ratio through the gear ratio corresponding to the intermediate speed. In the target speed change permitting means, a check is conducted again as to a driver's shift intention when the ratio between the input rotation and output rotation, i.e., the gear ratio reaches the gear ratio corresponding to the intermediate speed, and a change of the target speed to the driver's intended speed is permitted when the target speed differs from the (N-α)th speed, even after the change of the target speed is inhibited. Therefore, the shift control apparatus can respond to the driver's shift intention halfway during the dual changeover shift, and achieve the shift according to the driver's request quickly when the driver's shift intention is changed during the dual changeover shift control even after the change of the target speed is inhibited, instead of performing the shift again after an end of the dual changeover shift.

Moreover, the second friction element is released, the fourth friction element is engaged, and the engagement force of the first friction element is decreased before the attainment of the gear ratio corresponding to the intermediate speed. Therefore, even if the driver has no shift intention at the gear ratio corresponding to the intermediate speed, the decrease of the engagement pressure of the first friction element prevents the shift from being determined, and therefore, the shift control apparatus can achieve a smooth jump shift without causing a plurality of shift shocks in the dual changeover shift.

Moreover, when the gear ratio corresponding to the intermediate speed is reached with engagement of the second and third friction elements, the shift control apparatus checks the driver shift intention again, and permits the target speed to be changed to the intended speed if the target speed is different from the (N-α)th speed. Therefore, the apparatus can readily establish the intermediate speed as the shift speed, and consequently perform the shift from the intermediate speed to the target speed after the change, smoothly.

In the invention as recited in claim 2, the engagement force of the third friction element is increased before the gear ratio reaches the gear ratio corresponding to the intermediate speed. Accordingly, if the third speed is the element to be engaged in the target speed after the change, the apparatus takes over the increasing state of the engagement force of the third element at the intermediate speed when the change of the target speed is permitted.

In the invention as recited in claim 3, the second element is the element to be engaged in the target speed after the target change, the apparatus returns the engagement force of the second element to the state before the judgment of the dual changeover shift when the change of the target speed is permitted.

In the invention as recited in claim 4, the control apparatus further comprises: a gear ratio attainment judging means judging attainment of the gear ratio corresponding to the intermediate speed when the gear ratio becomes equal to a value smaller by a first predetermined value than an actual gear ratio of the intermediate speed; and a gear ratio passage judging means judging passage through the gear ratio corresponding to the intermediate speed when the gear ratio becomes equal to a value greater than a second predetermined value than the actual gear ratio of the intermediate speed. The target speed change permitting means is configured to permit a change of the target speed from a time when the gear ratio attainment judging means judges that the gear ratio corresponding to the intermediate speed is attained, until a time when the gear ratio passage judging means judges that the gear ratio corresponding to the intermediate speed is passed through.

In the invention as recited in claim 5, the first predetermined value or the second predetermined value is decreased as a vehicle speed increases.

In the invention as recited in claim 6, the first predetermined value is decreased as an oil temperature increases.

In the invention recited in claim 7, in a shift control apparatus for an automatic transmission provided with: a simple planetary gear set including a first sun gear, a first carrier and a first ring gear; a Ravigneaux planetary gear set including a second sun gear, a second carrier, a third sun gear, a third carrier and a third ring gear; a member fixing the first sun gear to a transmission case; an input member connected directly with the first ring gear; a first clutch selectively making and breaking connection between the first carrier and the third sun gear; a second clutch selectively making and breaking connection between the first carrier and the second sun gear; a third clutch selectively making and breaking connection between the third carrier and the input member; a first brake selectively making and breaking connection between the second carrier and the transmission case; a second brake selectively making and breaking connection between the second sun gear and the transmission case; an output member connected directly with the third ring gear; solenoid oil pressure control valves controlling engagement pressures for the first clutch, the second clutch, the third clutch, the first brake and the second brake, individually; a shift control means to achieve a first forward speed by engagement of the first clutch and the first brake, a second forward speed by engagement of the first clutch and the second brake, a third forward speed by engagement of the first clutch and the second clutch, a fourth forward speed by engagement of the first clutch and third clutch, a fifth forward speed by engagement of the second clutch and the third clutch, and a sixth forward speed by engagement of the third clutch and the second brake; the automatic transmission shift control apparatus comprises: a dual changeover shift judging means judging a shift from the sixth speed achieved by engagement of the third clutch and the second brake, to the third speed achieved by engagement of the first clutch and the second clutch; a 6-3 shift control means achieving the shift from the sixth speed to the third speed by releasing the second brake and engaging the second clutch at least at the time of judgment of dual changeover shift, decreasing an engagement force of the third clutch before a gear ratio reaches a gear ratio corresponding to the fifth speed, and releasing the third clutch and engaging the is first clutch at least after passage of the gear ratio through the gear ratio corresponding to the fifth speed; a target speed change inhibiting means which decides to inhibit a target speed after the end of the shift from being changed from the third speed at an appropriate timing in the shift from the sixth speed to the third speed until an end of the shift control; and a target speed change permitting means reconfirming a driver's shift intention when the gear ratio reaches the gear ratio corresponding to the fifth speed, and permitting the target speed from being changed to a driver's intended speed when the target speed differs from the third speed, even if a change of the target speed is inhibited.

In the invention recited in Claim 8, in a shift control apparatus for an automatic transmission provided with: a simple planetary gear set including a first sun gear, a first carrier and a first ring gear; a Ravigneaux planetary gear set including a second sun gear, a second carrier, a third sun gear, a third carrier and a third ring gear; a member fixing the first sun gear to a transmission case; an input member connected directly with the first ring gear; a first clutch selectively making and breaking connection between the first carrier and the third sun gear; a second clutch selectively making and breaking connection between the first carrier and the second sun gear; a third clutch selectively making and breaking connection between the third carrier and the input member; a first brake selectively making and breaking connection between the second carrier and the transmission case; a second brake selectively making and breaking connection between the second sun gear and the transmission case; an output member connected directly with the third ring gear; solenoid oil pressure control valves controlling engagement pressures for the first clutch, the second clutch, the third clutch, the first brake and the second brake, individually; a shift control means to achieve a first forward speed by engagement of the first clutch and the first brake, a second forward speed by engagement of the first clutch and the second brake, a third forward speed by engagement of the first clutch and the second clutch, a fourth forward speed by engagement of the first clutch and third clutch, a fifth forward speed by engagement of the second clutch and the third clutch, and a sixth forward speed by engagement of the third clutch and the second brake; an automatic transmission shift control apparatus comprises: a dual changeover shift judging means judging a shift from the sixth speed achieved by engagement of the third clutch and the second brake, to the third speed achieved by engagement of the first clutch and the second clutch; a 6-3 shift control means achieving the shift from the sixth speed to the third speed by releasing the second brake and engaging the first clutch at least at the time of judgment of dual changeover shift, decreasing an engagement force of the third clutch before a gear ratio reaches a gear ratio corresponding to the fifth speed, and releasing the third clutch and engaging the second clutch at least after passage of the gear ratio through the gear ratio corresponding to the fifth speed; a target speed change inhibiting means which decides to inhibit a target speed after the end of the shift from being changed from the third speed at an appropriate timing in the shift from the sixth speed to the third speed until an end of the shift control; and a target speed change permitting means reconfirming a driver's shift intention when the gear ratio reaches the gear ratio corresponding to the fourth speed, and permitting the target speed from being changed to a driver's intended speed when the target speed differs from the third speed, even if a change of the target speed is inhibited.

MODES(S) FOR CARRYING OUT THE INVENTION

In the following, a mode realizing an automatic transmission shift control apparatus according to the present invention will be explained on the basis of a first embodiment corresponding to claims 1~7.

(First Embodiment)

First, an explanation is made on the construction.

Figures 1, 2:
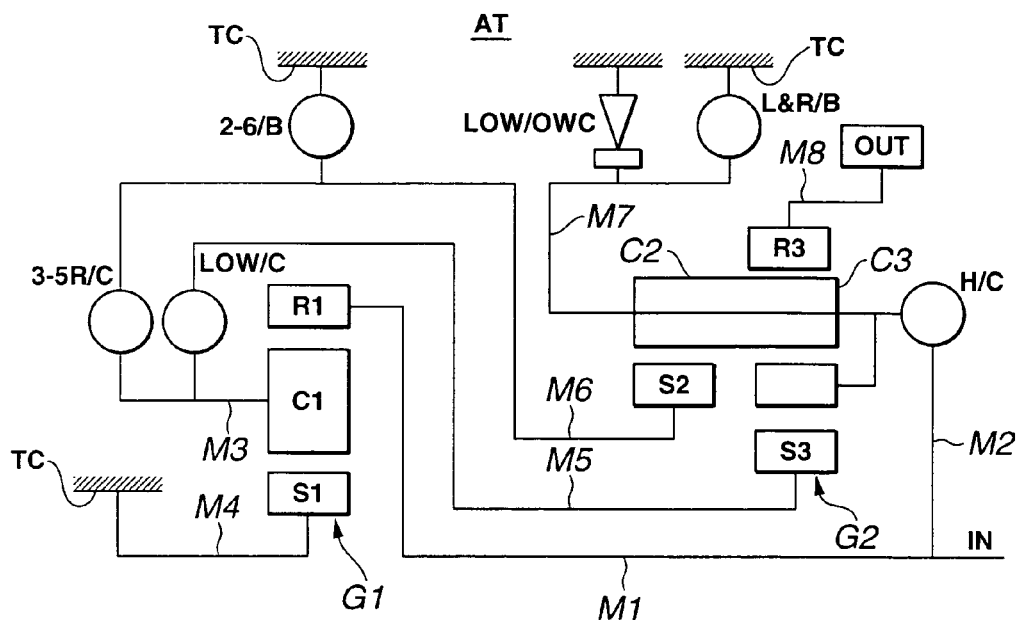
FIG. 1 is a skeleton view showing a gear train of a six forward speed, one reverse speed automatic transmission to which the a shift control apparatus according to a first embodiment.
FIG. 2 is a view showing an operation table of friction elements in shift control in the automatic transmission shift control apparatus according to the first embodiment.

FIG. 1 is a skeleton view showing a gear train of a six forward speed, one reverse speed automatic transmission to which the shift control apparatus according to the first embodiment is applied. As the gear train, this automatic transmission employs a combination of a simple planetary gear set G1 and a Ravigneaux compound planetary gear set G2. Simple planetary gear set G1 includes a first sun gear S1, a first carrier C1 and a first ring gear R1. Ravigneaux compound planetary gear set G2 includes a second sun gear S2, a second carrier C2, a third sun gear S3, a third carrier C3 and a third ring gear R3.

An input shaft IN (an input member) to which an engine driving force is inputted through an unshown engine and a torque converter is directly connected with first ring gear R1 through a first member M1, and further connected with third carrier C3 through a second member M2 and a high clutch H/C (a third clutch).

The first carrier C1 is connected with third sun gear S3 through a third member M3, a low clutch LOW/C (a first clutch) and a fifth member M5, and further connected with second sun gear S2 through the third member M3, a 3-5 reverse clutch 3-5R/C (a second clutch) and a sixth member M6. The sixth member M6 is fixed to a transmission case TC through a 2-6 brake 2-6/B (a second brake).

The first sun gear S1 is fixed to transmission case TC through a fourth member M4 (member). The second carrier C2 is fixed to transmission case TC through a seventh member M7, and a parallel arrangement of a low & reverse brake L&R/B (a first brake) and a low one-way clutch LOW/OWC. The third ring gear R3 is connected with an output gear OUT (an output member) through an eighth member M8.

In a D range position, the automatic transmission performs a six forward speed automatic shift control in accordance with an operating point determined by a vehicle speed and a throttle opening degree, and a shift schedule. In response to a select operation from the D range position to a R range position, a one reverse speed shift control is performed. FIG. 2 shows an operation table of friction elements in the shift control. In FIG. 2, a mark of a circle indicates the engagement, no marking indicates disengagement, a mark of X in a circle indicates engagement effected at the time of engine braking, and a mark of a circle with hatching indicates mechanical operation at the time of engine driving.

The first speed (1ST) is achieved by engagement of low clutch LOW/C and low and reverse brake L&R/B. In this case, the rotation of a reduced speed transmitted from input shaft IN through first member M1 and by way of the simple planetary gear set G1 is inputted from third member M3 to third sun gear S3 through low clutch LOW/C and fifth member M5. While a reaction force is received by second carrier C2 fixed to transmission case TC by the engagement of low one-way clutch LOW/OWC, third ring gear R3 rotates at a reduced speed, and outputs rotation of a speed reduced by the maximum reduction ratio from output gear OUT through eighth member M8.

At the time of engine braking, on the other hand, low & reverse brake L&R/B receives a reaction force instead of the free wheeling low one-way clutch LOW/OWC.

The second speed (2ND) is achieved by engagement of low clutch LOW/C and 2-6 brake 2-6/B. In this case, the rotation of a reduced speed transmitted from input shaft IN through first member M1 and by way of the simple planetary gear set G1 is inputted from third member M3 to third sun gear S3 through low clutch LOW/C and fifth member M5. While a reaction force is received by second sun gear S2 fixed to transmission case TC by the engagement of 2-6 brake 2-6/B, third ring gear R3 rotates at a reduced speed, and outputs, from output gear OUT through eighth member M8, rotation at a reduced speed at a reduction ratio smaller than the first speed.

The third speed (3RD) is achieved by engagement of low clutch LOW/C and 3-5 reverse clutch 3-5R/C. In this case, the rotation of a reduced speed transmitted from input shaft IN through first member M1 and by way of the simple planetary gear set G1 is inputted from third member M3 to third sun gear S3 through low clutch LOW/C and fifth member M5, and further inputted to second sun gear S2 from third member M3 through 3-5 reverse clutch 3-5R/C and sixth member M6, so that Ravigneaux compound planetary gear set G2 is put in a direct connection state. Accordingly, third gear R3 rotates at the same speed as both sun gears S2 and S3, and outputs, from output gear OUT through eighth member M8, rotation at a reduced speed at a reduction ratio smaller than the second speed.

The fourth speed (4TH) is achieved by engagement of low clutch LOW/C and high clutch H/C. In this case, the rotation of a reduced speed transmitted from input shaft IN through first member M1 and by way of the simple planetary gear set G1 is inputted from third member M3 to third sun gear S3 through low clutch LOW/C and fifth member M5, on one hand. On the other hand, from input shaft IN, the rotation at the same speed as input shaft IN is inputted to third carrier C3 through second member M2 and high clutch H/C. At a rotation intermediate between these two input rotations, third ring gear R3 rotates at a reduced speed, and delivers, from output gear OUT through eighth member M8, rotation at a speed slightly reduced from the input rotation.

The fifth speed (5TH) is achieved by engagement of 3-5 reverse clutch 3-5R/C and high clutch H/C. In this case, the rotation of a reduced speed transmitted from input shaft IN through first member M1 and by way of the simple planetary gear set G1 is inputted from third member M3 to second sun gear S2 through 3-5 reverse clutch 3-5R/C and fifth member M5, on one hand. On the other hand, from input shaft IN, the rotation at the same speed as input shaft IN is inputted to third carrier C3 through second member M2 and high clutch H/C. Third ring gear R3 rotates under the constraint from these two input rotations, and thereby delivers, from output gear OUT through eighth member M8, rotation at a speed slightly increased from the input rotation.

The sixth speed (6TH) is achieved by engagement of high clutch H/C and 2-6 brake 2-6/B. In this case, from input shaft IN, the rotation at the same speed as input shaft IN is inputted only to third carrier C3 through second member M2 and high clutch H/C. While a reaction force is received by second sun gear S2 fixed to transmission case TC by the engagement of 2-6 brake 2-6/B, third ring gear R3 rotates at an increased speed, and thereby delivers, from output gear OUT through eighth member M8, rotation at a speed further increased beyond the fifth speed.

The reverse speed (REV) is achieved by engagement of 3-5 reverse clutch 3-5R/C and low & reverse brake L&R/B. In this case, the rotation of a reduced speed transmitted from input shaft IN through first member M1 and by way of the simple planetary gear set G1 is inputted from third member M3 to second sun gear S2 through 3-5 reverse clutch 3-5R/C and sixth member M6. While a reaction force is received by second carrier C2 fixed to transmission case TC by the engagement of low & reverse brake L&R/B, third ring gear R3 rotates in the reverse direction, and thereby delivers, from output gear OUT through eighth member M8, reverse rotation at a reduced speed.

Figure 3:
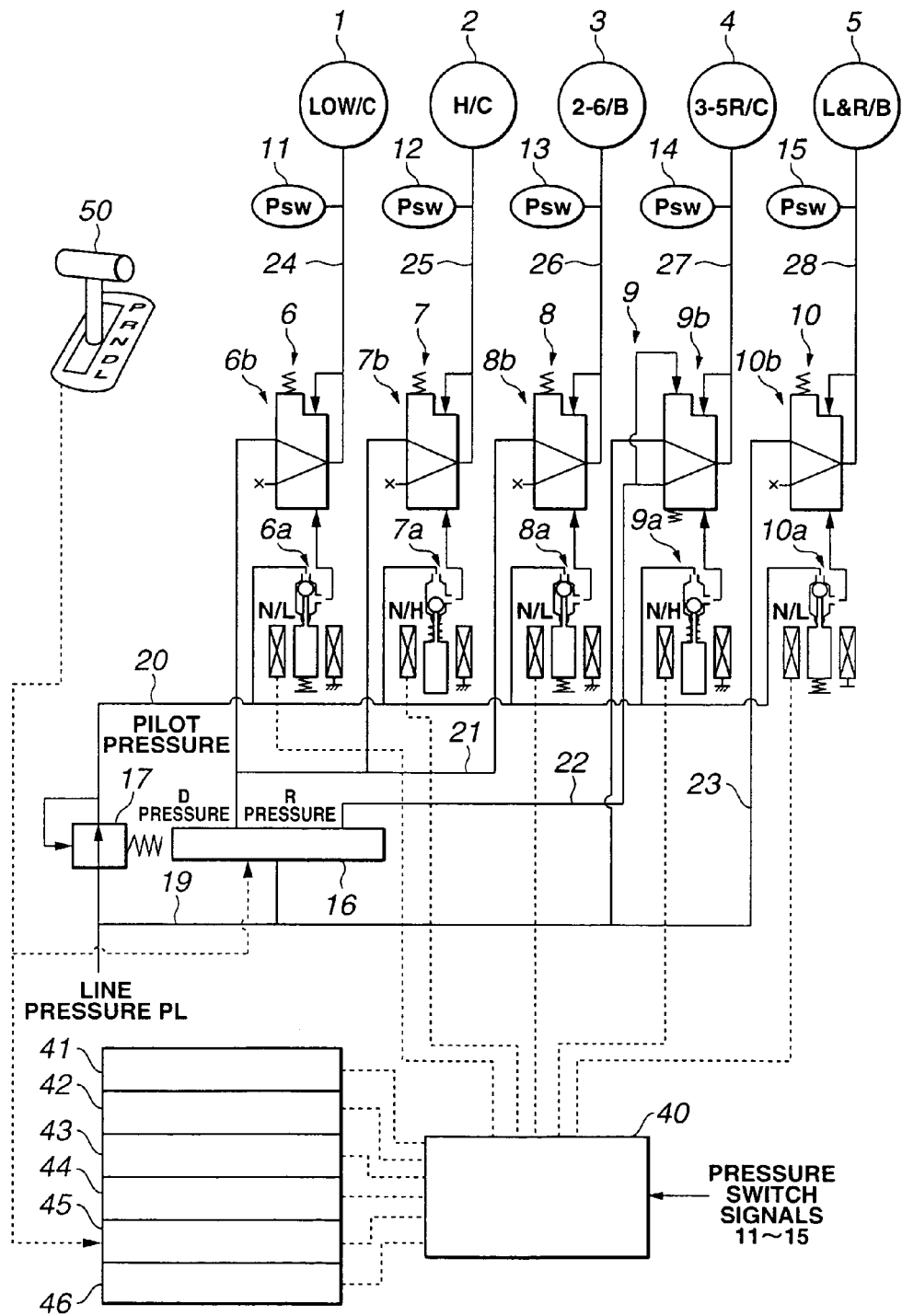
FIG. 3 is a view showing a hydraulic circuit and an electronic shift control system in the automatic transmission shift control apparatus according to the first embodiment.

Next, with reference to FIG. 3 showing a hydraulic circuit and an electronic shift control system to achieve the above-mentioned shift control, the construction thereof is explained. In FIG. 3; 1 denotes an engagement piston chamber of low clutch LOW/C; 2 denotes an engagement piston chamber of high clutch H/C; 3 denotes an engagement piston chamber of 2-6 brake 2-6/B; 4 denotes an engagement piston chamber of 3-5 reverse clutch 3-5R/C; and 5 denotes an engagement piston chamber of low & reverse brake L&R/B. Low clutch LOW/C, high clutch H/C, 2-6 brake 2-6/B, 3-5 reverse clutch 3-5R/C and low & reverse brake L&R/B are engaged by supplying an engagement pressure which is D range pressure or R range pressure, respectively, to engagement piston chambers 1~5, and released by draining the engagement pressure.

The D range pressure is a line pressure which is supplied through a manual valve 16, and which is produced only when the D range is selected. The R range pressure is a line pressure which is supplied through the manual valve 16, and which is produced only when the R range is selected. In the state other than R range, no oil pressure is produced by connection to a drain port.

In FIG. 3, 6 denotes a first oil pressure control valve for controlling the engagement pressure for low clutch LOW/C; 7 denotes a second oil pressure control valve for controlling the engagement pressure for high clutch H/C; 8 denotes a third oil pressure control valve for controlling the engagement pressure for 2-6 brake 2-6/B; 9 denotes a fourth oil pressure control valve for controlling the engagement pressure for 3-5 reverse clutch 3-5R/C; and 10 denotes a fifth oil pressure control valve for controlling the engagement pressure for low & reverse brake L&R/B.

The first oil pressure control valve 6 is composed of a first duty solenoid 6a for producing a shift control pressure with a solenoid force by using, as original pressure, a pilot pressure, and a first pressure regulating valve 6b for regulating a low clutch pressure by using, as original pressure, the D range pressure, and using, as operating signal pressure, the shift control pressure and a feedback pressure. The first duty solenoid 6a is arranged to reduce the low clutch pressure to zero at the time of solenoid OFF, and to increase the low clutch pressure as an ON duty ratio increases at the time of solenoid ON.

The second oil pressure control valve 7 is composed of a second duty solenoid 7a for producing a shift control pressure with a solenoid force by using, as original pressure, the pilot pressure, and a second pressure regulating valve 7b for regulating a high clutch pressure by using, as original pressure, the D range pressure, and using, as operating signal pressure, the shift control pressure and a feedback pressure. The second duty solenoid 7a is arranged to reduce the high clutch pressure to zero at the time of solenoid ON (100% ON duty ratio), to increase the high clutch pressure as an ON duty ratio decreases, and to make the high clutch pressure to a maximum pressure at the time of solenoid OFF.

The third oil pressure control valve 8 is composed of a third duty solenoid 8a for producing a shift control pressure with a solenoid force by using, as original pressure, the pilot pressure, and a third pressure regulating valve 8b for regulating a 2-6 brake pressure by using, as original pressure, the D range pressure, and using, as operating signal pressure, the shift control pressure and a feedback pressure. The third duty solenoid 8a is arranged to reduce the 2-6 brake pressure to zero at the time of solenoid OFF, to increase the 2-6 brake pressure as an ON duty ratio increases, and to make the high clutch pressure to a maximum pressure at the time of solenoid ON.

The fourth oil pressure control valve 9 is composed of a fourth duty solenoid 9a for producing a shift control pressure with a solenoid force by using, as original pressure, the pilot pressure, and a fourth pressure regulating valve 9b for regulating a 3-5 reverse clutch pressure by using, as original pressure, the line pressure, and using, as operating signal pressure, the shift control pressure, the R range pressure and a feedback pressure. The fourth duty solenoid 9a is arranged to reduce the 3-5 reverse clutch pressure to zero at the time of solenoid ON (100% ON duty ratio), to increase the 3-5 reverse clutch pressure as an ON duty ratio decreases, and to make the 3-5 reverse clutch pressure to a maximum pressure at the time of solenoid OFF.

The fifth oil pressure control valve 10 is composed of a fifth duty solenoid 10a for producing a shift control pressure with a solenoid force by using, as original pressure, the pilot pressure, and a fifth pressure regulating valve 10b for regulating a low & reverse brake pressure by using, as original pressure, the D range pressure or the R range pressure, and using, as operating signal pressure, the shift control pressure and a feedback pressure. The fifth duty solenoid 10a is arranged to reduce the low and reverse brake pressure to zero at the time of solenoid OFF, and to increase the low & reverse brake pressure as an ON duty ratio increases at the time of solenoid ON.

In FIG. 3; 11 denotes a first pressure switch; 12 a second pressure switch; 13 a third pressure switch; 14 a fourth pressure switch; 15 a fifth pressure switch; 16 a manual valve; 17 a pilot valve ; 19 a line pressure oil passage; 20 a pilot pressure oil passage; 21 a D range pressure oil passage; 22 a R range oil pressure passage; 23 a D&R range pressure oil passage; 24 a low clutch pressure oil passage; 25 a high clutch pressure oil passage; 26 a 2-6t brake pressure oil passage; 27 a 3-5 reverse clutch pressure oil passage; and 28 denotes a low & reverse brake pressure oil passage.

Thus, in low clutch pressure oil passage 14, high clutch pressure oil passage 25, 2-6 brake pressure oil passage 26, 3-5 reverse clutch pressure oil passage 27, low & reverse brake pressure oil passage 28, respectively, there are provided the first through fifth pressure switches 11~15 for detecting the existence or nonexistence of the engagement pressure with a switch signal (ON in the case of the existence of the engagement pressure, and OFF in the case of no engagement pressure).

In FIG. 3; 40 denotes an A/T control unit (shift controlling means); and 50 denotes a shift lever. The shift lever 50 has a P range for locking the transmission output shaft at the time of stoppage of the vehicle, a R range for attaining the reverse speed, an N range for attaining the neutral state meaning the state in which an input torque from the engine is not outputted, and the shift in the forward direction and the reverse direction is feasible, a D range for attaining each forward speed, and an engine braking range for controlling the low & reverse brake L&R/B to engagement in first speed. This shift lever 50 is connected with the manual valve 16. The position of manual valve 50 is changed by driver's operation of the shift lever 50, to achieve the intended shift state.

A reference numeral 41 denotes a vehicle speed sensor (a transmission output shaft rotation sensor); 42 a throttle sensor for sensing the throttle opening degree; 43 an engine rotation sensor for sensing the engine rotational speed; 44 a turbine rotation sensor (a transmission input shaft rotation sensor) for sensing a turbine speed, 45 an inhibitor switch for sensing the range position of shift lever 50; and 46 denotes an oil temperature sensor for sensing the oil temperature in the transmission. These components form an electronic shift control system. By receiving, as input, the switch signals from the pressure switches 11, 12, 13, 14 and 15, and the signals from the sensing or switching devices 41, 42, 43, 44, 45 and 46, the A/T control unit 40 performs an operation of calculating the gear ratio from the sensed values of turbine rotation sensor 45 and vehicle speed sensor 41, for example, performs a calculating operation in accordance with these input information items, a predetermined shift control rule, a fail safe control rule etc., and thereby delivers, to first duty solenoid 6a, second duty solenoid 7a, third duty solenoid 8a, fourth duty solenoid 9a, and fifth duty solenoid 10a, solenoid drive signals according to the results of the calculating operation.

The following is explanation on a 6-3 shift operation in the first embodiment when the torque inputted from the engine to the automatic transmission is in a positive drive state (drive state). Since the 6-3 shift is a dual changeover shift, the first embodiment is arranged to perform a changeover shift to an intermediate speed of fifth speed, and a changeover shift from fifth speed to third speed consecutively, and thereby to prevent simultaneous occurrence of the two distinct shifts.

[Shifting Operation in the Process of First Changeover]

The shifting operation in the process of the first changeover is as follows. In a shift start command region, the 2-6 brake 2-6/B is released rapidly and a first changeover inertia phase is started early. Moreover, oil pressure is supplied to 3-5 reverse clutch 3-5R/C and low clutch LOW/C which are engagement side friction elements, and a piston stroke is performed to set the engagement side friction elements in a standby state. In this case, the capacity of the high clutch H/C is decreased, but the 2-6 brake 2-6/B is slipping. Therefore, the torque produced by the engine is used to increase the engine speed, and the torque transmitted to high clutch H/C is decreased. As a result, the high clutch H/C does not slip.

In a first changeover progress region, the 2-6 brake 2-6/B slips. Accordingly, the system is put approximately in the neutral state, and the turbine speed increases. In other words, the gear ratio is changed to the fifth speed side and the shift makes progress.

In a first changeover ending region, when the gear ratio of the fifth speed is reached, the 3-5 reverse clutch 3-5R/C which is held in the standby state by oblique increase of the oil pressure after the end of the piston stroke, is engaged at a stretch. In this case, to prevent the output shaft torque from being increased to an output shaft torque of the fifth speed state, the capacity of the high clutch H/C is decreased in the stage in the first changeover progress region so that the high clutch H/C starts slipping before the torque produced by the engine is varied to the torque corresponding to the fifth speed and transmitted to the output shaft torque.

Thus, during the process of the first changeover, the tendency to the neutral is increased, and the shift is finished quickly from sixth speed to the intermediate speed of fifth speed, so that the system can prevent a direct upheaval to the fifth speed torque when the fifth speed is reached.

[Shifting Operation in the Process of Second Changeover]

The shifting operation in the process of the second changeover is as follows. In a second changeover progress region, the capacity of the high clutch H/C is increased from the level to which the capacity is decreased to cause slippage of the high clutch H/C in the process of the first changeover, to such a level not to disturb the progress of the shift. By so doing, the system restrains an extreme decrease of the output shaft torque and an undesired increase of shock in the inertia phase from the intermediate speed of fifth speed to third speed, and advances the inertia phase gradually to improve the shock. With this smooth shifting progress, the system can prevent a feeling of deceleration, or so-called "pulling shock", caused by a decrease of the output shaft torque during the shift.

In a second changeover ending region, when the gear ratio of third speed is reached, the low clutch LOW/C which is held in the standby state by a predetermined pressure after the end of the piston stroke, is engaged at a stretch. In this case, the capacity of the high clutch H/C is increased to a dragging state, so as not to cause a direct upheaval to the third speed torque at the end of the shift.

In a chamfering region at the time of the second changeover, to prevent a direct upheaval to the third speed torque after the end of the shift, the high clutch H/C is subjected to an oblique drainage so as to cause the output shaft torque to increase obliquely, instead of increasing at a stretch, until the output shaft torque finally reaches an output shaft torque corresponding to third speed.

Thus, in the process of the second changeover, the gear ratio is varied smoothly to prevent shock, and a direct upheaval to the third speed torque is prevented at or after the end of the shift.

[Reshift Inhibiting Control in the Dual Changeover]

Figure 4:
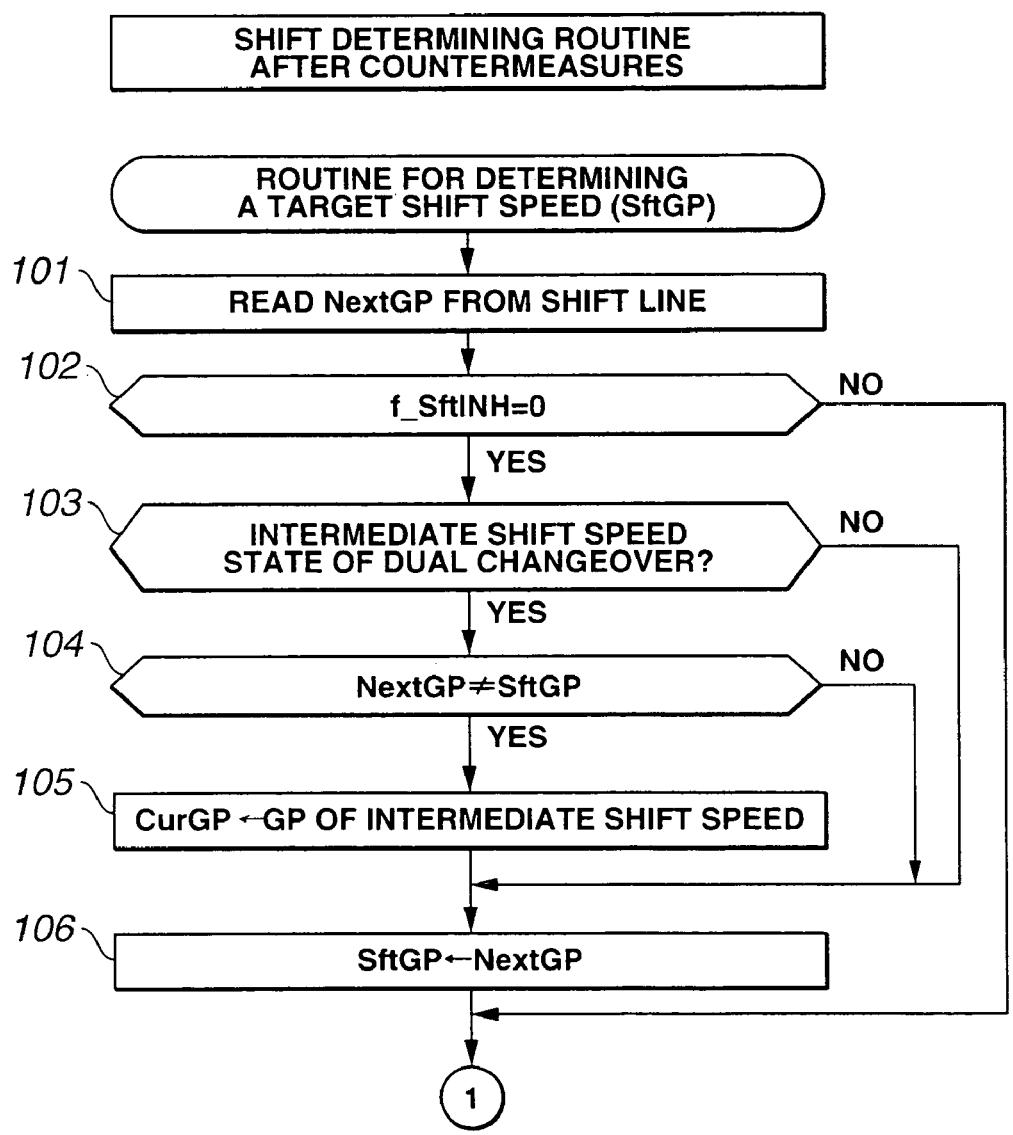
FIG. 4 is a flowchart showing the flow of a target speed determination control process performed in an A/T control unit in the first embodiment.
Figure 5:
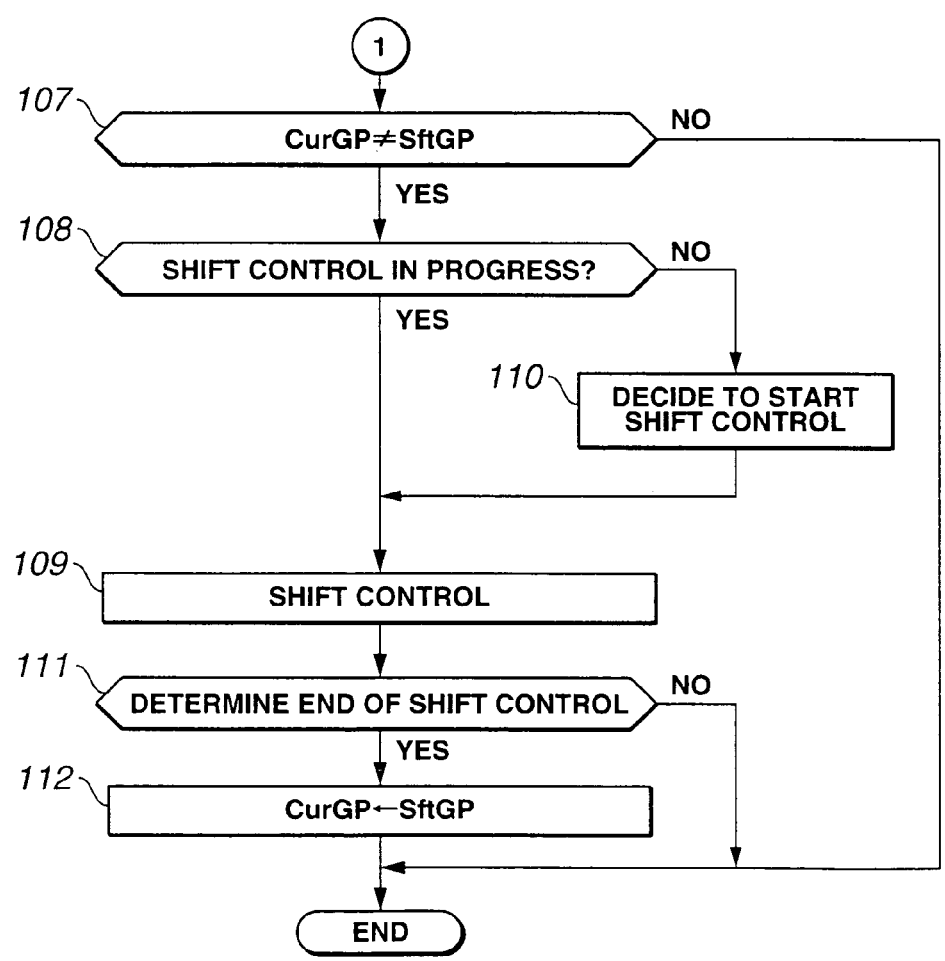
FIG. 5 is a flowchart showing the flow of the target speed determination control process performed in the A/T control unit in the first embodiment.

FIG. 4 and FIG. 5 show a flowchart of the flow of a control process for determining a target speed SftGP, performed by the A/T control unit 40. The following is explanation on each step.

At step 101, the routine reads a driver's demanded shift gear ratio NextGP from a shift line diagram.

At step 102, the routine determines whether a target shift speed change permission flag f_SftINH is0 or not, that is whether a reshift is inhibited or not. The routine proceeds to step 103 in the case of0, that is, permission, and to step 107 in the case of inhibition.

At step 103, the routine determines whether the intermediated speed state of the dual changeover is reached, that is whether the transmission is in the vicinity of the gear ratio of the intermediate speed established by termination of one changeover. The routine proceeds to step 104 in the case of YES, and to step 106 in the case of NO.

At step 104, the routine determines whether the driver's demanded shift gear ratio NextGP and the control target shift speed SftGP are in agreement or not. The routine proceeds to step 105 in the case of disagreement, and to step 106 in the case of agreement.

At step 105, the routine updates a before-shift gear speed CurGP to the intermediate shift speed.

At step 106, the routine updates the control target shift speed SftGP to the driver's demand shift gear ratio NextGP.

At step 107, the routine determines whether the before-shift gear speed CurGP and the target shift speed SftGP are in agreement or not. The routine proceeds to step 108 in the case of disagreement, and terminates this control in the case of agreement.

At step 108, the routine determines whether the shift control is in progress. The routine proceeds to step 109 when the shift control is in progress, and to step 110 when the shift control is not in progress.

At step 109, the routine performs the shift control.

At step 110, the routine decides to start the shift control.

At step 111, the routine determines whether the shift control is finished. The routine proceeds to step 112 in the case of judgment of the shift being finished, and terminates this control in the case of judgment of the shift being not yet finished.

At step 112, the routine updates the before-shift speed to the control target speed.

Figure 6:
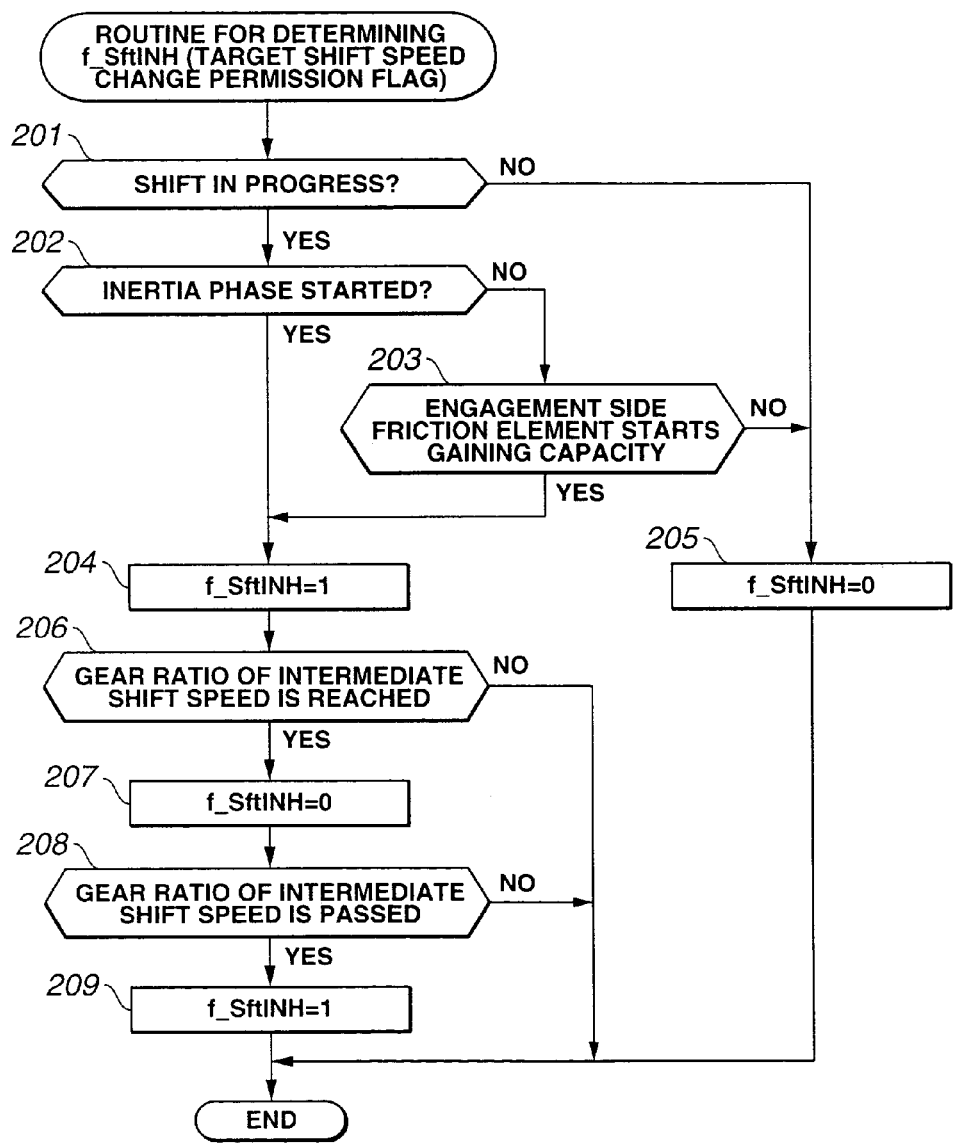
FIG. 6 is a flowchart showing the flow of a target speed change permission flag control process performed in the A/T control unit in the first embodiment.

FIG. 6 is a flowchart showing the flow of control process for determining the target shift speed change permission flag f_SftINH, performed by A/T control unit 40. The following is explanation on each step.

At step 201, the routine determines whether the shift is in progress or not. The routine proceeds to step 202 when the shift is in progress, and to step 205 when the shift is not in progress.

At step 202, the routine determines the inertia phase is started or not. The routine proceeds to step 204 when the inertia phase is started, and to step 203 when the inertial phase is not yet started.

At step 203, the routine determines whether the friction element to be engaged starts gaining a capacity. The routine proceeds to step 204 when an increase of the capacity is started, and to step 205 when the capacity is null.

At step 204, the routine sets the target shift speed change permission flag f_SftINH to one.

At step 205, the routine resets the target shift speed change permission flag f_SftINH to zero.

At step 206, the routine determines whether the gear ratio of the intermediate shift speed is attained or not. The routine proceeds to step 207 when the gear ratio of the intermediate shift speed is attained, and terminates this control when the gear ratio of the intermediate shift speed is not yet attained. In consideration of sensing error of rotation sensor, and reading deviation, the gear ratio used this attainment determination is set equal to a smaller value smaller than the gear ratio of the intermediate shift speed by a predetermined value (a first predetermined value)(toward the gear ratio of the sixth speed). For example, the gear ratio of the attainment determination is set to a value smaller by about 5% than the gear ratio. In view of the actual control, the setting is greater than the percentage for the gear ratio used for determination of passage through the gear ratio of the intermediate shift speed as mentioned later. Moreover, this gear ratio is variable in dependence on the vehicle speed and temperature. The sensing accuracy increases as the vehicle speed increases. Therefore, the percentage is set to a smaller value as the vehicle speed increases. The hydraulic response characteristic improves as the oil temperature increases. Therefore, the percentage is set to a smaller value as the oil temperature becomes higher.

At step 207, the routine resets the target shift speed change permission flag f_SftINH to zero.

At step 208, the routine determines whether the gear ratio of the intermediate shift speed is passed or not. The routine proceeds to step 209 when the gear ratio of the intermediate shift speed is passed, and terminates this control when it is not passed. In consideration of sensing error of rotation sensor, and reading deviation, and in order to securely sense a start of slippage of the high clutch H/C, the gear ratio used for this passage determination is set equal to a greater value greater than the gear ratio of the intermediate shift speed by a predetermined value (a second predetermined value)(toward the gear ratio of the third speed). For example, the gear ratio of the passage determination is set to a value smaller by about 2% than the gear ratio. Moreover, this gear ratio is variable in dependence on the vehicle speed. The sensing accuracy increases as the vehicle speed increases. Therefore, the percentage is set to a smaller value as the vehicle speed increases.

At step 209, the routine sets the target shift speed change permission flag f_SftINH to one.

Figure 7:
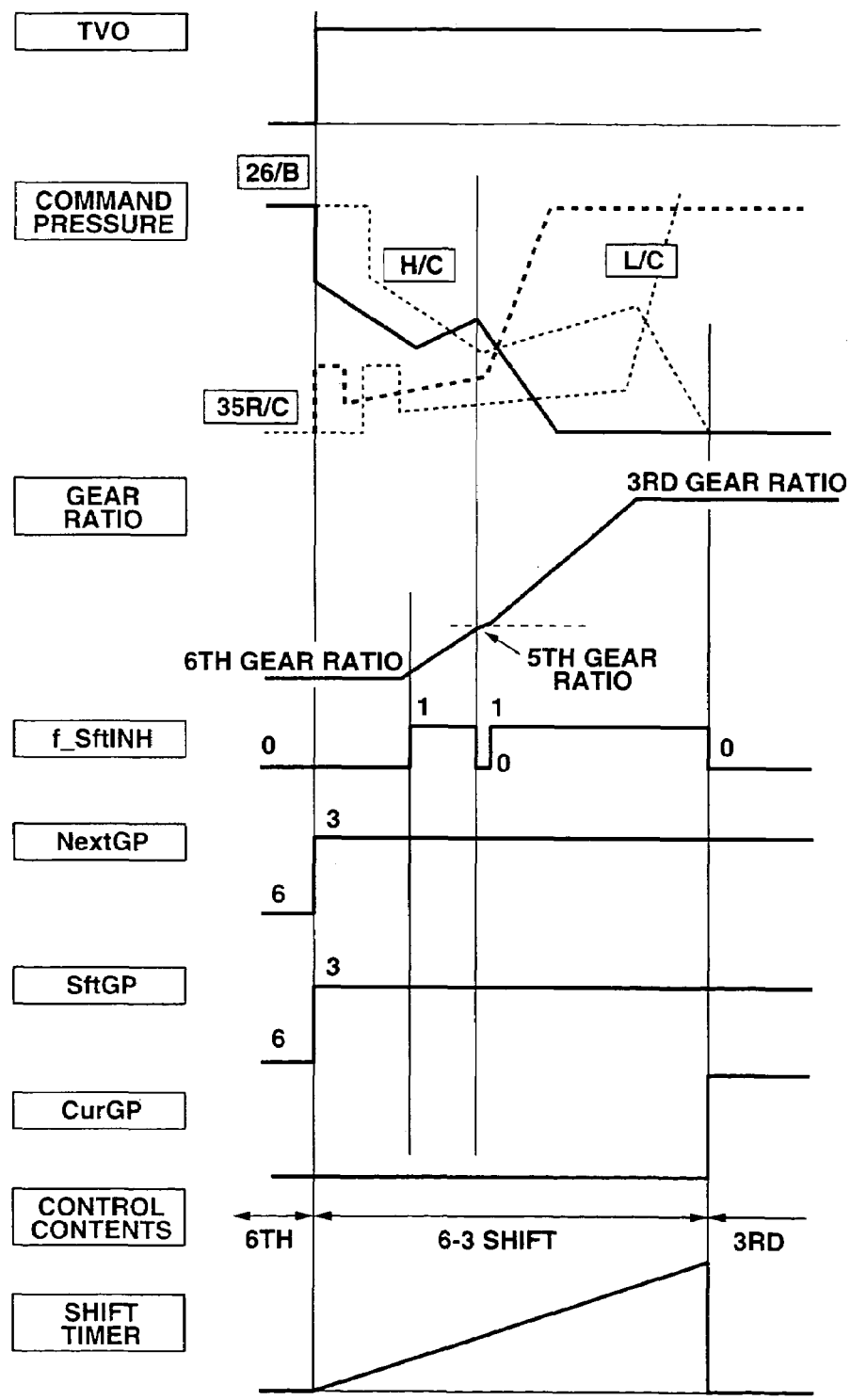
FIG. 7 is a time chart of an example in which a 6-3 shift executed in the A/T control unit of the first embodiment is performed, and the driver's intended speed is not changed.

FIG. 7 is a time chart illustrating operation of a 6-3 shift, as a concrete example showing the control of determining the target shift speed SftGP, and the control of determining the target shift speed change permission flag f_SftINH.

As mentioned before, the 6-3 shift is performed while performing a reshift permission at the gear ratio corresponding to the fifth speed serving as the intermediate shift speed.

In this shift operation, the process of setting the target shift speed SftGP to the third speed is determined by the flow in the shift determining process as shown in FIGS. 4 and 5, of step 101→step 102→step 103→step 106→step 107. In this case, the 6-3 shift is performed without modification since the driver does not change the target shift speed during the 6-3 shift.

Figure 8:
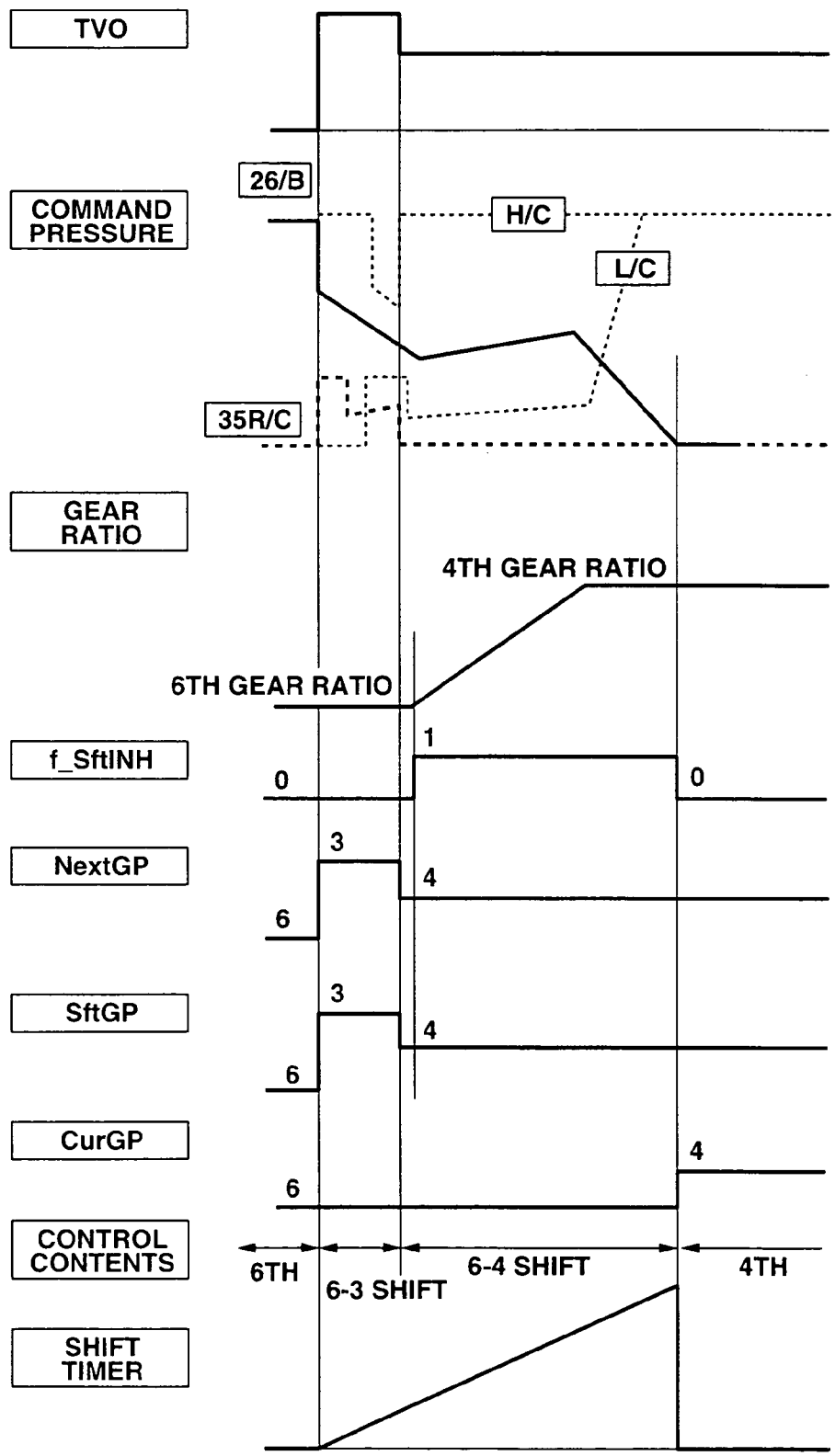
FIG. 8 is a time chart of an example in which during the 6-3 shift executed in the A/T control unit of the first embodiment, before the change of the target speed is inhibited, the driver's intended speed is changed and the shift is changed to a 6-4 shift.

FIG. 8 is a time chart illustrating, as a concrete example showing the control of determining the target shift speed SftGP, and the control of determining the target shift speed change permission flag f_SftINH, the situation in which the target shift speed is changed from the third speed to the fourth speed during a 6-3 shift, before a start of the inertia phase, that is before the target shift speed change permission flag f_SftINH is seto to one.

As mentioned before, the 6-3 shift is accomplished via the gear ratio corresponding to the fifth speed as the intermediate shift speed established by completion of one changeover.

In this shift operation, the process at an instant at which the target shift speed SftGP is changed from the third speed to the fourth speed is determined by the flow in the shift determining process shown in FIGS. 4 and 5, of step 101→step 102→step 103→step 106→step 107→step 108→step 109→step 111.

The flag "f_SftINH" used in step 102 in the above-mentioned flow is determined in the following manner in the routine of FIG. 6 for determining f_SftINH (the target shift speed change permission flag). In the control flow of the target shift speed change permission flag f_SftINH shown in FIG. 6, the target shift speed change permission flag f_SftINH remains set at 0 when the inertia phase is not started in the process of the shift, and moreover, the friction element to be engaged (in this example, 3-5 reverse clutch 3-5R/C) does not gain a capacity yet. During this period, the depression of the accelerator pedal is decreased by an operation of the driver, a 3-4 UP line in the shift line diagram is crossed, and NextGP representing the driver's demand shift speed is changed to the fourth speed at step 101. Consequently, the target shift speed SftGP of the shift control is changed to the fourth speed by the flow of step 102 (since f_SftINH=0) →step 103→step 106. Thereafter, the control flows through step 107 (since CurGP (6th speed)≠ SftGP (fourth speed) →step 108→step 109, and step 109 starts the 6-4 shift since the before-shift shift speed is sixth speed, and the control target shift speed SftGP is fourth speed. At a timing of ending the 6-4 shift, the control flows through step 101→step 102 (since a change of the target shift speed is inhibited by the flowchart of FIG. 6 after a start of the inertia phase)d step 107→step 108→step 109→step 111 (since decision is made that the shift control is finished)→step 112, and step 112 substitutes, for CurGP, the value of fourth speed used as the shift control target speed SftGP. Therefore, CurGP is updated to the gear speed after the shift. As evident from FIG. 8, at the timing at which the target shift speed SftGP is changed, the control system returns the oil pressure for the high clutch H/C to be engaged in the fourth speed, to the oil pressure before the start of the shift because the high clutch is free from slippage though a decrease of the oil pressure is started; takes over the oil pressure for the low clutch LOW/C which is to be engage in the fourth speed, and which has started a piston stroke by receiving the oil pressure, and stops the supply of the oil pressure to the 3-5 reverse clutch 3-5R/C to be engaged in the third speed, notwithstanding the state of standby. In this case, since the 6-3 shift is changed to the 6-4 shift, the changeover shift requires only one changeover shift, and there is no intermediate shift speed established by completion of one changeover shift as in the dual changeover. Namely, in the case of 6-4 shift, the high clutch H/C is an engagement element common to the sixth speed and fourth speed, and the shift control requires only a changeover between the 2-6 brake 2-6/B and low clutch LOW/C, so that there is no intermediate shift speed. Therefore, after once set to one, the target speed change permission flag f_SftINH remains equal to one until end of the 6-4 shift control. The target shift speed is not changed halfway even if the driver's intended speed (NextGP) is changed.

Figure 9:
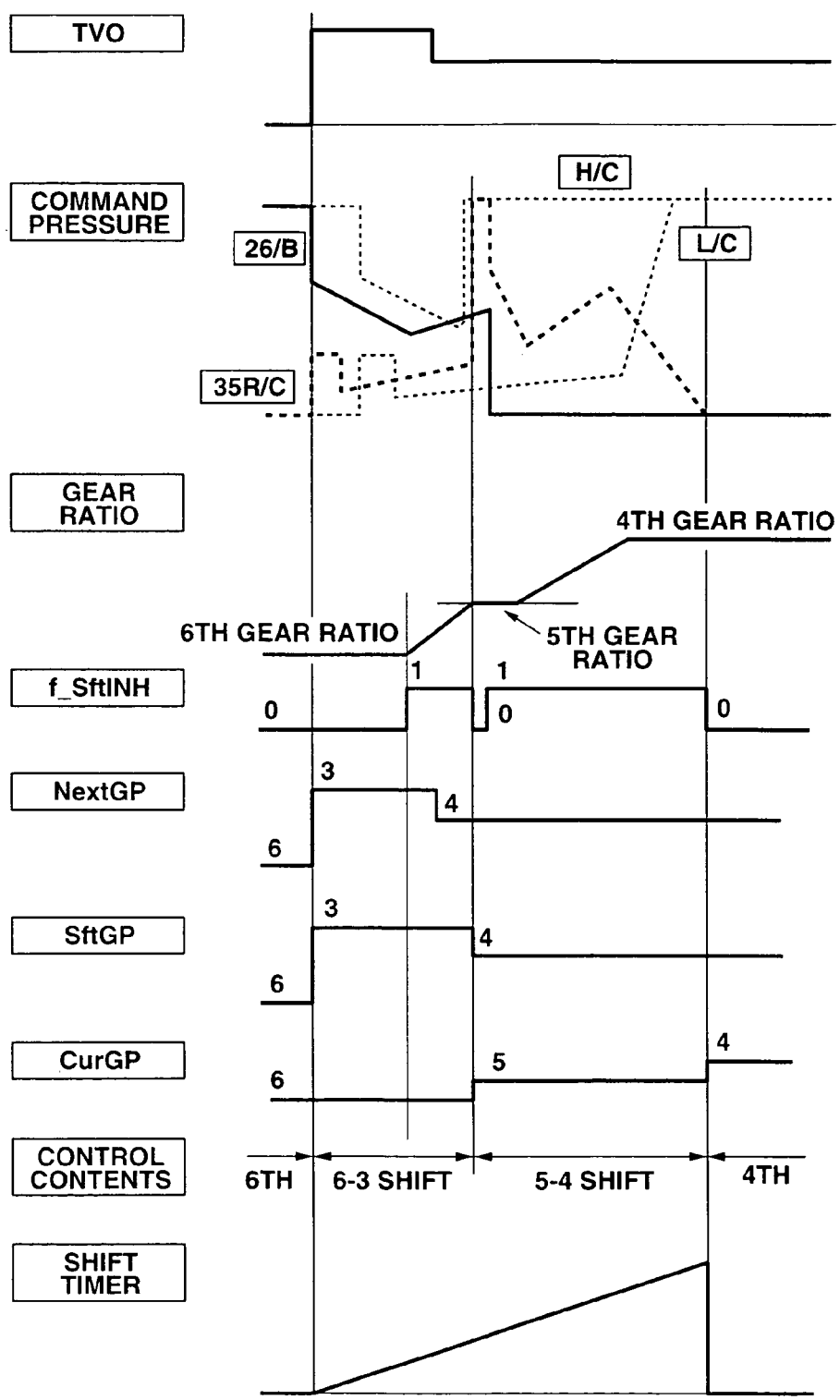
FIG. 9 is a time chart showing an example in which during the 6-3 shift executed in the A/T control unit of the first embodiment, after the change of the target speed is inhibited, the driver's intended speed is changed and the shift is changed to the 6-4 shift before the gear ratio reaches the gear ratio corresponding to the intermediate speed.

FIG. 9 is a time chart illustrating, as a concrete example showing the control of determining the target shift speed SftGP, and the control of determining the target shift speed change permission flag f_SftINH, the situation in which the reshift inhibition is once cancelled at the gear ratio corresponding to the fifth speed as the intermediate speed established by completion of one changeover in the 6-3 shift, and the target shift speed is changed to the fourth speed.

As an example of the 6-3 shift, the following is an explanation on a shift composed of a first changeover by release of the 2-6 brake 2-6/B and engagement of 3-5 reverse clutch 3-5R/C, and a second changeover by release of the high clutch H/C and engagement of low clutch LOW/C. In this case, the gear ratio corresponding to the intermediate shift speed is the gear ratio of the fifth speed established when the 2-6 brake 2-6/B is release from the sixth speed, and the 3-5 reverse clutch 3-5R/C is engaged. The process at the instant at which the target shift speed SftGP is changed from the third speed to the fourth speed, is determined by the flow in the shift control flow shown in FIGS. 4 and 5, of step 101→step 102→step 103→step 104→step 105→step 106→step 107→step 108→step 109→step 111.

The flag "f_SftINH" used in step 102 in the above-mentioned flow is determined in the following manner in the routine of FIG. 6 for determining f_SftINH (the target shift speed change permission flag). Simultaneously with a start of the inertia phase, the target shift speed change permission flag f_SftINH is determined by the flow in the flowchart of FIG. 6 of step 201→step 202→step 204→step 206. As a result, step 204 sets f_SftINH to one, and inhibits the change of the target shift speed. When, in this state, it is determined that the gear ratio of the fifth speed as the intermediate shift speed is attained, the target shift speed change permission flag f_SftINH is determined by the flow in the flowchart of FIG. 6 of step 201→step 202→step 204→step 206→step 207→step 208. As a result, step 207 resets f_SftINH to 0, and permits the change of the target shift speed.

Reverting to the shift control flow, in the flow of step 101→step 102→step 103→step 104→step 105→step 106, because of crossing of the 3-4UP line in the shift line diagram due to a decrease in the depression of the accelerator pedal caused by an operation of the driver, the step 101 sets the driver's demand speed NextGP to the fourth speed, and the step 106 updates the control target shift speed SftGP to the fourth speed of the demand shift speed NextGP in conformity with the change of the target shift speed. At step 105, the fifth speed of the 6-3 shift is set to CurGP. Therefore, via the flow of step 107→step 108→step 109, the shift control is performed. As evident from FIG. 9, at the time when the before-shift speed CurGP and the target shift speed SftGP are changed, the clutches and brakes are controlled in the following manner. First, as to the high clutch H/C to be engaged in the fifth speed and fourth speed, the oil pressure starts decreasing, but a clutch slippage does not start yet. Therefore, the oil pressure is returned to the oil pressure before the start of the 6-3 shift. As to the 2-6 brake 2-6/B to be released in the fifth speed, the oil pressure is decreased rapidly. As to the 3-5 reverse clutch 3-5R/C to be engaged in fifth speed, the oil pressure is increased rapidly to establish the fifth speed. As to the low clutch LOW/C which has started a piston stroke and which is to be engaged in the fifth speed, the oil pressure is taken over directly. Thereafter, because the before-shift speed CurGP is the fifth speed and the control target shift speed is the fourth speed, the 5-4 shift is started, and at the timing at which the 5-4 shift is ended, the flow is step 101→step 102 (since, after the start of the inertia phase, the change of the target speed is already inhibited in the flowchart of FIG. 6)→step 107→step 108→step 109→step 111(since a judgment is made for the end of the shift control)→step 112, and step 112 substitutes the value of fourth speed which has been the target shift speed SftGP, for CurGP. Consequently, CurGP is updated to the after-shift speed of fourth speed.

As explained above, the automatic transmission shift control apparatus according to the first embodiment is arranged to put the target shift permission flag to the permission state once and to check the driver's shift intention again when the system reaches the gear ratio corresponding to the intermediate shift speed of fifth speed attained by the completion of one changeover. Therefore, if the driver's demand shift gear speed NextGP differs from the third speed, the change of the target shift speed to the driver's demand shift speed is permitted and performed.

Therefore, when the driver's shift intention is changed during the dual changeover shift, the shift control apparatus can achieve the shift conforming to the driver's demand quickly by responding to the driver's shift intention halfway during the dual changeover shift, instead of performing a shift operation after the end of the dual changeover shift. (Effect corresponding to claim 1)

The apparatus is arranged to perform changeovers one by one, namely to set the intermediate speed as the target and establish the intermediate shift speed once, and to check the driver's intention again. Therefore, when the inhibition of the change is cancelled at the intermediate speed, the apparatus can shift to the changed speed quickly if the driver intends to change the speed. However, if the driver does not intend to change the speed, there is a problem that a shift shock is produced in each shift because of the occurrences of the two changeover shifts, and a smooth dual changeover shift is not attainable. By performing this control, by contrast, the apparatus can achieve a quick shift when the driver intends to change the speed, and achieve a smooth dual changeover shift by holding the shift unestablished with a decrease of H/C before the attainment of the gear ratio corresponding to the fifth speed and thereby prevent the occurrences of a plurality of shift shocks in the dual changeover shift when the driver does not intend to change the speed. (Effect corresponding to claim 1)

Moreover, the apparatus is arranged to check the driver's shift intention again when the gear ratio reaches the gear ratio corresponding to fifth speed attained by engagement of high clutch H/C and 3-5 reverse clutch 3-5R/C. Therefore, in the case of existence of a driver's shift intention, the apparatus can readily establish the state of the fifth speed, and hence achieve a smooth operation of the following shift from the intermediate speed of fifth speed to the target speed after the change, fourth speed, for example. (Effect corresponding to claim 1)

The apparatus is arranged to increase the engagement pressure of low clutch LOW/C before the gear ratio reaches the gear ratio corresponding to the fifth speed, and arranged to control the oil pressure of low clutch LOW/C by taking over the oil pressure already increased, in the case of the shift from fifth speed to fourth speed. Therefore, when the driver's intention is changed, and the friction element to be engaged is the same, the apparatus can further reduce the shift time to the driver's intended speed. (Effect corresponding claim 2)

When the apparatus permits change of the target speed, the apparatus returns the oil pressure of H/C which is the engagement side friction element of the speed after change, to the oil pressure before the start of the 6-3 shift. Therefore, the apparatus can establish the intermediate speed immediately and reliably, and hence reduce the shift shock, without undesired shift of the gear ratio toward the fourth speed's side and back. Moreover, the control of the oil pressure is easy for the high clutch which is the release side friction element from the intermediate speed to the renewed target speed. (Effect corresponding to claim 3)

The gear ratio for determining the attainment of the intermediate speed of fifth speed is set equal to a value smaller than the actual gear ratio of fifth speed by a predetermined value (toward the gear ratio of sixth speed). Therefore, the apparatus can restrain the sensing error and reading deviation of rotation sensors, and improve the reliability of the control. (Effect corresponding to claim 4)

The gear ratio for determining the passage of the intermediate speed of fifth speed is set equal to a value greater than the actual gear ratio of fifth speed by a predetermined value (toward the gear ratio of third speed). Therefore, the apparatus can restrain the sensing error and reading deviation of rotation sensors, and improve the reliability of the control. (Effect corresponding to claim 4)

Moreover, the above-mentioned predetermined value is decreased as the vehicle speed becomes higher, and hence the reliability of the control is increased. (Effect corresponding to claim 5)

Moreover, as the temperature becomes higher, the above-mentioned value is increased (toward the gear ratio corresponding to the intermediate speed), and hence the reliability of the control is increased. (Effect corresponding to claim 6)

Figure 10:
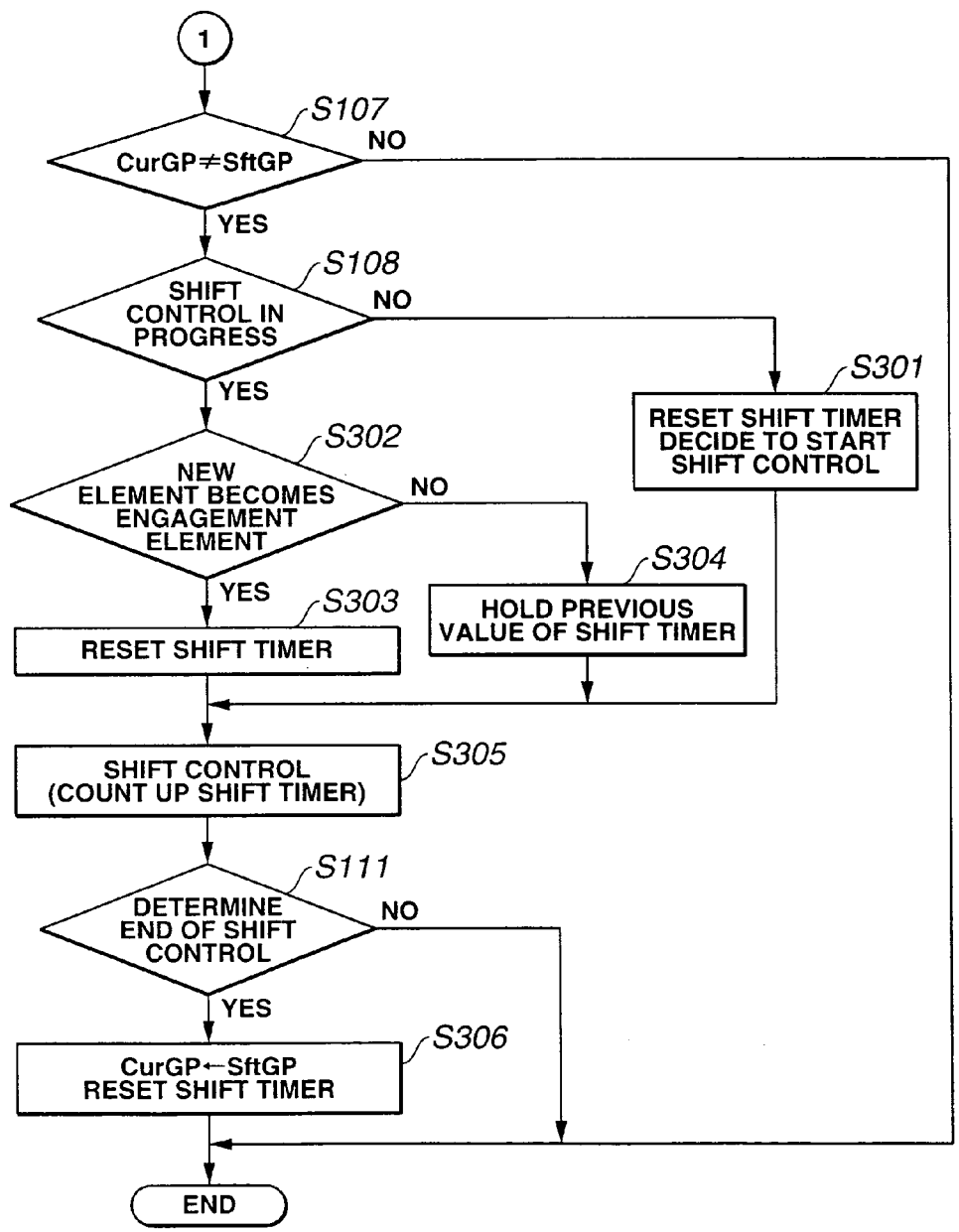
FIG. 10 is a detailed flowchart showing the flow of a target speed determination control process executed in the A/T control unit of the first embodiment of FIG. 5.
Figure 11:
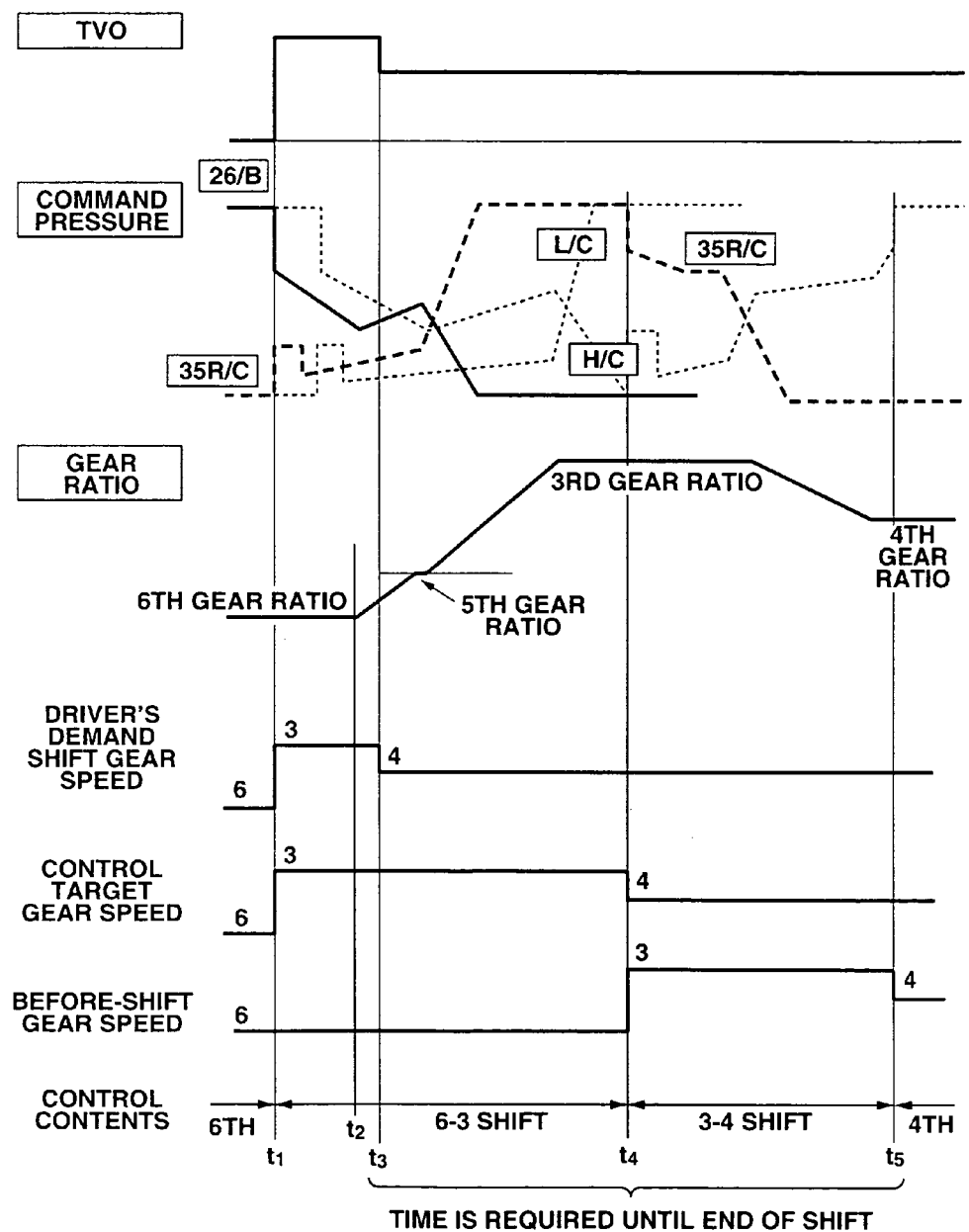
FIG. 11 is a time chart showing an example in which, after the change of the target speed is inhibited in the 6-3 shift in an apparatus of earlier technology, the driver's intended speed is changed.

The following is a detailed explanation, by the use of FIGS. 10, 8 and 9, on an example in which a continuous operation is possible even if the target speed is changed at the gear ratio corresponding to the intermediate speed during the dual changeover shift control in the case that the engagement side friction element remains unchanged after the change of the target speed.

FIG. 10 is a flowchart showing the flow of a control process for determining target shift speed SftGP, performed by A/T control unit 40. FIG. 10 corresponds to FIG. 5 of the first embodiment. The first half of the flowchart is the same as FIG. 4, and the same step numbers are given to steps similar to the first embodiment, so that explanation is omitted.

Steps not included in the flowchart of FIG. 5 according to the first embodiment, but added in the embodiment are: steps 301, step 302, step 303, step 304, step 305 and step 306.

Since the judgment of step 108 is that the shift control is not in progress, a step 301 resets a shift timer, decides to start the shift control, and proceeds to step 305. This shift timer starts counting up from the start of the shift, and continues the counting until an end of the shift. For example, the apparatus can control the oil pressures of release side and engagement side friction elements in accordance with the value of the timer, and can estimate clutch oil pressure.

At step 302, the routine determines whether a new friction element becomes an engagement element with the change of the target shift speed SftGP. The routine proceeds to step 303 in the case of YES, and to step 304 in the case of NO.

At step 303, the routine resets the shift timer started from the start of the dual changeover shift, and proceeds to step 305.

At step 304, the routine holds the previous value of the shift timer. That is, even through the target speed SftGP is changed, the shift timer is taken over from the before-change state.

At step 305, the routine performs the shift control and counts up the shift timer. At step 111, the routine examines whether the shift control is finished. In the case of the end of the shift, the routine proceeds to step 306, and terminates this control when it is judged that the shift is not yet finished.

At step 306, the routine rewrites the before-shift speed CurGP to the target shift speed SftGP, and resets the shift timer.

By using the time chart of FIG. 8 showing the example in which the target shift speed is changed from the third speed to the fourth speed before the start of the inertia phase, that is before the target speed change permission flag f_SftINH is set to one, an explanation is given of the count-up and reset of the shift timer.

From the start of the 6-3 shift, the shift timer continues the counting-up operation, and the flow in FIGS. 1 and 10 is S101→S102→S103→S106→S107→S108→S302→S304→S305→S111. At the instant at which the target speed is changed, the flow is also S101→S102→S103→S106→S107→S108→ S302→S304→S305→S111 on the flowchart. In other words, the target shift speed SftGP is changed to the fourth speed requiring the engagement of low clutch LOW/C which is also the engagement side element to be engaged in the third speed. Therefore, the flow is step 302→step 304→step 305, and the shift timer continues the count-up operation without being reset.

Consequently, the apparatus can estimate, from the timer value of the shift timer, the oil pressure of low clutch LOW/C and the oil pressure of 2-6 brake at the instant at which the target speed SftGP is changed from third speed to fourth speed, and therefore the apparatus can take over the currently existing oil pressures even if the target speed is changed. Therefore, eliminating the need to restart the 6-4 shift by resetting the oil pressure of low clutch LOW/C and the oil pressure of 2-6 brake, the apparatus can reduce the time to achieve the target shift speed.

By using the time chart of FIG. 9 showing the example in which the reshift inhibition is cancelled at the gear ratio corresponding to the intermediate speed of fifth speed established by the completion of one changeover during the 6-3 shift, and the target speed is changed to the fourth speed, an explanation is given of the count-up and reset of the shift timer. The shift timer continues the count-up operation from the start of the 6-3 shift, and the flow is step 101→step 102→step 103→step 106→step 107→step 108→step 302→step 304→step 305→step 111 on the flow chart of FIGS. 1 and 9. At the gear ratio corresponding to fifth speed, the reshift is permitted. At the instant at which the target speed is changed from the third speed to the fourth speed, the flow on the chart is step 101→step 102→step 103→step 104→step 105→step 106→step 107→step 108→step 302→step 304→step 305→step 111. Therefore, the shift timer is held without being reset at step 304, and the shift timer is count up at step 305 because, in spite of the change of the target speed, the friction element to be engaged in the second changeover in the 6-3 shift is the same as the friction element to be engaged in the shift from the intermediate speed to the after-change target speed.

Consequently, the shift timer holds the timer value from the start of the 6-3 shift even if the fifth speed is once established and the target speed SftGP is changed from the third speed to the fourth speed. Therefore, from this value, the apparatus can accurately estimate the oil pressure of low clutch LOW/C, for example, at the time of the change, so that the oil pressure control can be taken over when the target speed is changed. Therefore, by eliminating the need for resetting the oil pressure of low clutch LOW/C again and restarting the 5-4 shift, the apparatus can further reduce the time to achieve the target speed.

(Another Embodiment)

Although the invention has been described above by reference to certain embodiments of the invention, the invention is not limited to the embodiments described above in the concrete configuration. Design change or addition are allowable as long as there is no departure from the gist of the invention according to each claim.

For example, though, in the first embodiment, the reshift is permitted at the gear ratio corresponding the fifth speed, it is possible to obtain effect similar to the effect recited in the first embodiment by permitting the reshift at the gear ratio corresponding to the fourth speed when the first changeover involves H/C and low clutch LOW/C. Moreover, in a 5-2 shift which is a dual changeover shift, it is optional to permit the reshift at the gear ratio corresponding to fourth speed or third speed in dependence on the combination in the first changeover.

In the first embodiment, the invention is applied to the six forward speed, one reverse speed automatic transmission having the skeleton shown in FIG. 1. However, even in the case of an automatic transmission having a skeleton structure different from FIG. 1, the application is possible to a shift which involves engagement of two or more friction elements and release of two of more friction elements, and which has a shift speed intermediate between the before-shift speed and the after-shift speed, attained by release of one of the two friction elements to be released and engagement of one of the two friction elements to be engaged.

In the illustrated example of the first embodiment, the automatic transmission has the hydraulic circuit configuration provided with solenoid oil pressure control valves individually controlling the engagement pressures of a plurality of friction elements involved in the shift. However, the present invention is applicable to an automatic transmission performing a shift control by the use of a shift valve, and moreover to an automatic transmission having four forward speeds, five forward speeds or seven forward speeds if there is a dual changeover shift involving changeovers of two engagement friction element and two release friction elements.

What is claimed is:

1. In a shift control apparatus for an automatic transmission provided with a shift control means to achieve a plurality of forward speeds by the control of engagement and disengagement of a plurality of friction elements participating in the shift of the automatic transmission, the automatic transmission shift control apparatus comprising:

a dual changeover shift judging means making a judgment about a shift from an Nth speed achieved by bringing a first friction element and a second friction element at least into an engagement state, to an (N-α)th speed which is achieved by bringing at least the first friction element and the second friction element into a release state and engaging a third friction element and a fourth friction element, and which has at least one intermediate shift speed between the Nth speed and the (N-α)th speed, achieved by engaging the second friction element and the third friction element;

a jump shift control means achieving the shift from the Nth speed to the (N-α)th speed, by releasing the first friction element and engaging the fourth friction element at least at the time of judgment of dual changeover shift, decreasing an engagement force of the second friction element before a gear ratio reaches a gear ratio corresponding to the intermediate shift speed, and releasing the second friction element and engaging the third friction element at least after passage of the gear ratio through the gear ratio corresponding to the intermediate shift speed;

a target shift speed change inhibiting means which makes a judgement to inhibit a target shift speed from being changed from the (N-α)th speed at a predetermined timing after a start of the shift from the Nth speed to the (N-α)th speed until an end of the shift control; and a target shift speed change permitting means rechecking a driver's shift intention when the gear ratio reaches the gear ratio corresponding to the intermediate shift speed, and permitting the target shift speed to be changed to a shift speed corresponding the driver's intention when the target shift speed differs from the (N-α)th speed, even if the change of the target speed is inhibited.

2. The control apparatus for the automatic transmission as recited in claim 1, wherein, before the gear ratio reaches the gear ratio corresponding to the intermediate speed, the engagement force of the third friction element is increased; and when the change of target shift speed is permitted in a case in which an friction element to be engaged in the target speed after the change is the third friction element, an increasing state of the engagement force of the third friction element at the intermediate shift speed is taken over.

3. The control apparatus for the automatic transmission as recited in claim 1, wherein, in a case in which an friction element to be engaged in the target speed after the change is the second friction element, the engagement force of the second friction element is restored to a state before the dual changeover shift determination when the change of the target shift speed is permitted.

4. The control apparatus for the automatic transmission as recited in claim 1, wherein the control apparatus further comprises:

a gear ratio attainment means making a judgment of attainment of the gear ratio corresponding to the intermediate speed when the gear ratio becomes equal to a value smaller by a first predetermined value than an actual gear ratio of the intermediate speed; and a gear ratio passage judging means making a judgment of passage through the gear ratio corresponding to the intermediate speed when the gear ratio becomes equal to a value greater than a second predetermined value than the actual gear ratio of the intermediate speed; and wherein the target speed change permitting means is configured to permit change of the target speed from a time when the gear ratio attainment judging means judges that the gear ratio corresponding to the intermediate speed is attained, until a time when the gear ratio passage judging means judges that the gear ratio corresponding to the intermediate speed is passed through.

5. The control apparatus for the automatic transmission as recited in claim 4, wherein the first predetermined value or the second predetermined value is decreased as a vehicle speed increases.

6. The control apparatus for the automatic transmission as recited in claim 4, wherein the first predetermined value is decreased as an oil temperature increases.

7. In a shift control apparatus for an automatic transmission provided with:

a simple planetary gear set including a first sun gear, a first carrier and a first ring gear;

a Ravigneaux compound planetary gear set including a second sun gear, a second carrier, a third sun gear, a third carrier and a third ring gear;

a member fixing the first sun gear to a transmission case;

an input member connected directly with the first ring gear;

a first clutch selectively making and breaking connection between the first carrier and the third sun gear;

a second clutch selectively making and breaking connection between the first carrier and the second sun gear;

a third clutch selectively making and breaking connection between the third carrier and the input member;

a first brake selectively making and breaking connection between the second carrier and the transmission case;

a second brake selectively making and breaking connection between the second sun gear and the transmission case;

an output member connected directly with the third ring gear;

solenoid oil pressure control valves controlling engagement pressures for the first clutch, the second clutch, the third clutch, the first brake and the second brake, individually; and a shift control means to achieve a first forward speed by engagement of the first clutch and the first brake, a second forward speed by engagement of the first clutch and the second brake, a third forward speed by engagement of the first clutch and the second clutch, a fourth forward speed by engagement of the first clutch and third clutch, a fifth forward speed by engagement of the second clutch and the third clutch, and a sixth forward speed by engagement of the third clutch and the second brake;

the automatic transmission shift control apparatus comprising:

a dual changeover shift judging means making a judgment about a shift from the sixth speed achieved by engagement of the third clutch and the second brake, to the third speed achieved by engagement of the first clutch and the second clutch;

a 6-3 shift control means achieving the shift from the sixth speed to the third speed by releasing the second brake and engaging the second clutch at least at the time of the judgment of dual changeover shift, decreasing an engagement force of the third clutch before a gear ratio reaches a gear ratio corresponding to the fifth speed, and releasing the third clutch and engaging the first clutch at least after passage of the gear ratio through the gear ratio corresponding to the fifth speed;

a target speed change inhibiting means which decides to inhibit a target speed to be attained after the end of the shift from being changed from the third speed at a timing in the shift from the sixth speed to the third speed until an end of the shift control; and a target speed change permitting means rechecking a driver's shift intention when the gear ratio reaches the gear ratio corresponding to the fifth speed, and permitting the target speed to be changed to a driver's intended speed when the target speed differs from the third speed, even if a change of the target speed is inhibited.

8. In a shift control apparatus for an automatic transmission provided with:

a simple planetary gear set including a first sun gear, a first carrier and a first ring gear;

a Ravigneaux planetary gear set including a second sun gear, a second carrier, a third sun gear, a third carrier and a third ring gear;

a member fixing the first sun gear to a transmission case;

an input member connected directly with the first ring gear;

a first clutch selectively making and breaking connection between the first carrier and the third sun gear;

a second clutch selectively making and breaking connection between the first carrier and the second sun gear;

a third clutch selectively making and breaking connection between the third carrier and the input member;

a first brake selectively making and breaking connection between the second carrier and the transmission case;

a second brake selectively making and breaking connection between the second sun gear and the transmission case;

an output member connected directly with the third ring gear;

solenoid oil pressure control valves controlling engagement pressures for the first clutch, the second clutch, the third clutch, the first brake and the second brake, individually; and a shift control means to achieve a first forward speed by engagement of the first clutch and the first brake, a second forward speed by engagement of the first clutch and the second brake, a third forward speed by engagement of the first clutch and the second clutch, a fourth forward speed by engagement of the first clutch and third clutch, a fifth forward speed by engagement of the second clutch and the third clutch, and a sixth forward speed by engagement of the third clutch and the second brake;

the automatic transmission shift control apparatus comprising:

a dual changeover shift judging means making a judgment about a shift from the sixth speed achieved by engagement of the third clutch and the second brake, to the third speed achieved by engagement of the first clutch and the second clutch;

a 6-3 shift control means achieving the shift from the sixth speed to the third speed by releasing the second brake and engaging the first clutch at least at the time of the judgment of dual changeover shift, decreasing an engagement force of the third clutch before a gear ratio reaches a gear ratio corresponding to the fifth speed, and releasing the third clutch and engaging the second clutch at least after passage of the gear ratio through the gear ratio corresponding to the fifth speed;

a target speed change inhibiting means which decides to inhibit a target speed to be attained after the end of the shift from being changed from the third speed at an appropriate timing in the shift from the sixth speed to the third speed until an end of the shift control; and a target speed change permitting means rechecking a driver's shift intention when the gear ratio reaches the gear ratio corresponding to the fourth speed, and permitting the target speed to be changed to a driver's intended speed when the target speed differs from the third speed, even if a change of the target speed is inhibited.

9. The control apparatus for the automatic transmission as recited in claim 2, wherein, in a case in which an friction element to be engaged in the target speed after the change is the second friction element, the engagement force of the second friction element is restored to a state before the dual changeover shift determination when the change of the target shift speed is permitted.

10. The control apparatus for the automatic transmission as recited in claim 2, wherein the control apparatus further comprises:

a gear ratio attainment d means making a judgment of attainment of the gear ratio corresponding to the intermediate speed when the gear ratio becomes equal to a value smaller by a first predetermined value than an actual gear ratio of the intermediate speed; and a gear ratio passage judging means making a judgment of passage through the gear ratio corresponding to the intermediate speed when the gear ratio becomes equal to a value greater than a second predetermined value than the actual gear ratio of the intermediate speed; and wherein the target speed change permitting means is configured to permit change of the target speed from a time when the gear ratio attainment judging means judges that the gear ratio corresponding to the intermediate speed is attained, until a time when the gear ratio passage judging means judges that the gear ratio corresponding to the intermediate speed is passed through.

11. The control apparatus for the automatic transmission as recited in claim 3, wherein the control apparatus further comprises:

a gear ratio attainment means making a judgment of attainment of the gear ratio corresponding to the intermediate speed when the gear ratio becomes equal to a value smaller by a first predetermined value than an actual gear ratio of the intermediate speed; and a gear ratio passage judging means making a judgment of passage through the gear ratio corresponding to the intermediate speed when the gear ratio becomes equal to a value greater than a second predetermined value than the actual gear ratio of the intermediate speed; and wherein the target speed change permitting means is configured to permit change of the target speed from a time when the gear ratio attainment judging means judges that the gear ratio corresponding to the intermediate speed is attained, until a time when the gear ratio passage judging means judges that the gear ratio corresponding to the intermediate speed is passed through.

12. The control apparatus for the automatic transmission as recited in claim 5, wherein the first predetermined value is decreased as an oil temperature increases.

* * * * *